(12) United States Patent
Nikitin

(10) Patent No.: US 11,863,736 B2
(45) Date of Patent: *Jan. 2, 2024

(54) SYSTEMS, DEVICES, AND METHODS FOR ENABLING CAMERA ADJUSTMENTS

(71) Applicant: Intelligent Security Systems Corporation, Woodbridge, NJ (US)

(72) Inventor: Andrey Nikitin, Moscow (RU)

(73) Assignee: Intelligent Security Systems Corporation, Woodbridge, NJ (US)

( * ) Notice: Subject to any disclaimer, the term of this patent is extended or adjusted under 35 U.S.C. 154(b) by 359 days.

This patent is subject to a terminal disclaimer.

(21) Appl. No.: 17/195,327

(22) Filed: Mar. 8, 2021

(65) Prior Publication Data

US 2021/0195097 A1 Jun. 24, 2021

Related U.S. Application Data

(63) Continuation of application No. 16/790,544, filed on Feb. 13, 2020, now Pat. No. 10,944,900.

(60) Provisional application No. 62/804,803, filed on Feb. 13, 2019.

(51) Int. Cl.
*H04N 17/00* (2006.01)
*H04N 7/18* (2006.01)
(Continued)

(52) U.S. Cl.
CPC ............. *H04N 17/002* (2013.01); *G06T 7/70* (2017.01); *G06T 7/80* (2017.01); *G06V 10/147* (2022.01); *G06V 10/245* (2022.01); *G06V 20/54* (2022.01); *H04N 7/183* (2013.01); *H04N 23/54* (2023.01); *H04N 23/64* (2023.01); *H04N 23/661* (2023.01); *H04N 23/695* (2023.01); *G06T 2200/24* (2013.01); *G06T 2207/30236* (2013.01); *G06V 20/625* (2022.01)

(58) Field of Classification Search
CPC ........... H04N 5/23222; H04N 5/23299; H04N 5/2253; H04N 5/23206; H04N 7/183; G06T 7/80; G06T 7/70; G06K 9/00785
USPC .......................................................... 348/143
See application file for complete search history.

(56) References Cited

U.S. PATENT DOCUMENTS 9,947,079 B1 4/2018 Stepanenko
2004/0096084 A1 5/2004 Tamoto et al.
(Continued)

OTHER PUBLICATIONS

Chen et al., An Efficient Approach for the Calibration of Multiple PTZ Cameras, May 2007, IEEE Transactions on Automation Science and Engineering 4(2):286-293 (8 pages).
(Continued)

*Primary Examiner* — Matthew David Kim
(74) *Attorney, Agent, or Firm* — Dentons US LLP

(57) ABSTRACT

Determine a current position of a camera relative to a road based on a set of imagery from the camera and a recommended position of the camera relative to the road based on the set of imagery from the camera, while the camera is maintained at a constant height relative to the road and a constant lateral distance relative to the road. The camera can be positionally adjusted from the current position to the recommended position based on a movement of the camera about a Y-axis or a Z-axis of the camera at that time relative to the road. In order to enable movement of the camera, a guide can be output to a user such that the user can follow the guide and move the camera from the current position to the recommended position.

19 Claims, 6 Drawing Sheets

(51) Int. Cl.
*G06T 7/70* (2017.01)
*G06T 7/80* (2017.01)
*G06V 20/54* (2022.01)
*H04N 23/60* (2023.01)
*H04N 23/54* (2023.01)
*H04N 23/661* (2023.01)
*H04N 23/695* (2023.01)
*G06V 10/147* (2022.01)
*G06V 10/24* (2022.01)
*G06V 20/62* (2022.01)

(56) References Cited

U.S. PATENT DOCUMENTS

| | | | |
|---|---|---|---|
| 2013/0342692 A1* | 12/2013 | Li | G01N 21/538 348/143 |
| 2014/0354819 A1* | 12/2014 | Venegas, Jr. | H04N 23/661 348/151 |
| 2015/0229838 A1 | 8/2015 | Hakim et al. | |
| 2016/0018212 A1 | 1/2016 | Rouh et al. | |
| 2016/0350921 A1* | 12/2016 | Bataller | G06T 7/80 |
| 2017/0098304 A1* | 4/2017 | Blais-Morin | H04N 23/60 |
| 2018/0268687 A1* | 9/2018 | Che | G08G 1/017 |
| 2020/0059606 A1* | 2/2020 | Brady | G01C 15/00 |

OTHER PUBLICATIONS

Corral-Soto et al., Automatic Single-View Calibration and Rectification from Parallel Planar Curves, Computer Vision—ECCV 2014 pp. 813-827 (15 pages).

Kanhere et al., Automatic Camera Calibration Using Pattern Detection for Vision-Based Speed Sensing, Transportation Research board Annual Meeting, Jan. 2008 (18 pages).

Persad et al., Calibration of PTZ Surveillance Camera Using 3D Indoor Model, Canadian Geomatics Conference and Commission I Symposium, Jan. 2010 (6 pages).

* cited by examiner

SYSTEMS, DEVICES, AND METHODS FOR ENABLING CAMERA ADJUSTMENTS

CROSS-REFERENCE TO RELATED PATENT APPLICATIONS

This patent application is a Continuation of U.S. patent application Ser. No. 16/790,544 filed 13 Feb. 2020; which claims a benefit of U.S. Provisional Application 62/804,803 filed 13 Feb. 2019; each of which is incorporated by reference herein for all purposes.

TECHNICAL FIELD

This disclosure relates to enabling camera adjustments.

BACKGROUND

A support structure can host a camera in proximity of a road. As such, when a vehicle is positioned on the road, the camera can image the vehicle for various purposes (e.g. license plate recognition, object recognition). Positioning the camera for such imaging is technically problematic because there are various different techniques to position the camera. These techniques can vary widely based on what type of camera is used, what type of lens is used, how high the camera is raised from the road, how far the camera is laterally spaced from the road, how wide the road spans, how many lanes the road has, what type of image resolution is desired, how is the camera oriented relative to the road (e.g. azimuth, pitch), and other technical factors. Consequently, there may be a plurality of installation rules (e.g. angle rules, azimuth rules, pitch rules, field of vision rules, optical axis rules, image resolution rules) to position the camera, while accommodating for such technical factors. However, the installation rules do not allow the camera to be optimally utilized when deviations to these factors occur, especially cumulatively. As such, these deviations may negatively impact imaging and subsequent image processing operations. Also, these deviations may make installation/maintenance of the camera complicated, time-consuming, and laborious, especially when a technician is not sufficiently experienced.

SUMMARY

Broadly, this disclosure discloses various computing technologies for enabling camera adjustments. These computing technologies enable a processor-based determination of (a) a current position of a camera relative to a road based on a set of imagery from the camera (e.g. external calibration) and (b) a recommended position of the camera relative to the road based on the set of imagery from the camera, while the camera is maintained at a constant height relative to the road (e.g. road surface) and a constant lateral distance relative to the road (e.g. road edge). The camera is hosted via a support structure and can be positionally adjusted (e.g. manually, motor, actuator) on the support structure from the current position to the recommended position based on a movement (e.g. rotation, tilt, pivot, slide) of the camera about a Z-axis (e.g. azimuth) of the camera at that time relative to the support structure and the road or based on a movement of the camera about a Y-axis (e.g. pitch) of the camera at that time relative to the support structure and the road. The camera is kept at the constant height relative to the road and the constant lateral distance relative to the road between the current position and the recommended position. In order to enable movement of the camera, a processor-generated guidance (e.g. visual marker, wizard, set of parameters) can be output (e.g. displayed) to a user (e.g. human technician, processor) such that the user can enable (e.g. perform, request) a manual adjustment of the camera from the current position to the recommended position or an automatic adjustment (e.g. local, remote) of the camera from the current position to the recommended position. For example, the camera can be positionally adjusted based on moving the camera in accordance with the processor-generated guidance (e.g. move the camera so that imagery is aligned/overlaid/coincides with the processor-generated guidance). As such, when the camera is generally oriented at the road from the support structure and imaging the road, then a processor (e.g. server, desktop, laptop, tablet, smartphone) can determine (a) the current position of the camera relative to the road and the support structure based on imaging the road and (b) the recommended position of the camera relative to the road and the support structure based on imaging the road, while the camera is maintained at a constant height relative to the road (e.g. road surface) and a constant lateral distance relative to the road (e.g. road edge). The camera can be positionally adjusted (e.g. manually, motor, actuator) on the support structure from the current position to the recommended position based on a movement (e.g. rotation, tilt, pivot, slide) of the camera about a Z-axis (e.g. azimuth) of the camera at that time relative to the support structure and the road or based on a movement of the camera about a Y-axis (e.g. pitch) of the camera at that time relative to the support structure and the road. The processor can generate a visual marker for the user so that the user can see how the camera needs to be positionally adjusted relative to the support structure and relative to the road. For example, this can be performed during installation/commissioning/maintenance of the camera. Also, this can also effectively minimize dangerous manual placement of physical road markers for camera calibration purposes or effectively minimize use of additional expensive measuring devices.

In an embodiment, a method comprises: determining, by a server, a current position of a camera based on a set of imagery received from the camera while the camera is hosted via a support structure, maintained at a constant height relative to a road, and maintained at a constant lateral distance relative to the road, wherein the support structure is in proximity of the road during the current position; determining, by the server, a recommended position of the camera based on the set of imagery while the camera is in the current position, wherein the camera is movable between the current position and the recommended position while the camera is kept at the constant height and the constant lateral distance; presenting, by the server, a user interface on a client while the camera images the road during the current position, wherein the user interface concurrently shows the road, a current pattern, and a recommended pattern, wherein the current pattern corresponds to the current position, wherein the recommended pattern corresponds to the recommended position, wherein the current pattern and the recommended pattern are visually distinct from each other and are shown over the road; receiving, by the server, a user input from the client while the user interface concurrently shows the road, the current pattern, and the recommended pattern as the camera images the road during the current position, wherein the user input moves the current pattern toward the recommended pattern over the road on the user interface; and enabling, by the server, the camera to be moved from the current position toward the recommended position relative to the road and the support structure based on the user input while the camera is kept at the constant height and the constant lateral distance and the user interface concurrently shows the road, the current pattern, and the recommended pattern as the camera images the road.

In an embodiment, a method comprises: determining, by a processor, a current position of a camera based on a set of imagery received from the camera while the camera is hosted via a support structure, maintained at a constant height relative to a road, and maintained at a constant lateral distance relative to the road, wherein the support structure is in proximity of the road during the current position; determining, by the processor, a recommended position of the camera based on the set of imagery while the camera is in the current position, wherein the camera is movable between the current position and the recommended position while the camera is kept at the constant height and the constant lateral distance; requesting, by the processor, a display to present a user interface while the camera images the road during the current position, wherein the user interface concurrently shows the road, a current pattern, and a recommended pattern, wherein the current pattern corresponds to the current position, wherein the recommended pattern corresponds to the recommended position, wherein the current pattern and the recommended pattern are visually distinct from each other and are shown over the road; moving, by the processor, the current pattern toward the recommended pattern over the road on the user interface while the camera is moved from the current position toward the recommended position relative to the road and the support structure and is kept at the constant height and the constant lateral distance.

DETAILED DESCRIPTION

Figure 1:
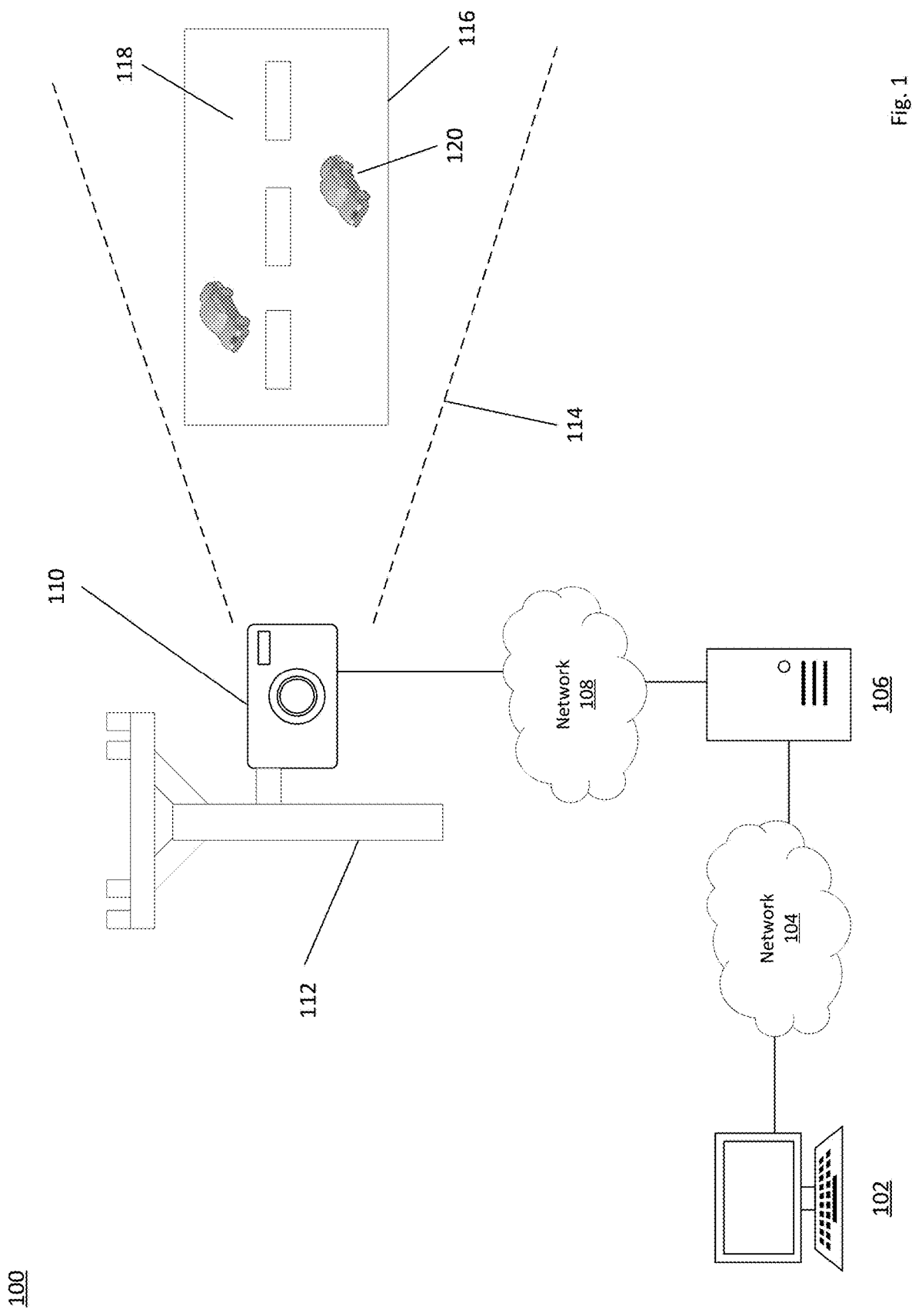
FIG. 1 shows a schematic diagram of an embodiment of a system for enabling an adjustment of a camera according to this disclosure.

Broadly, this disclosure discloses various computing technologies for enabling camera adjustments. These computing technologies enable a processor-based determination of (a) a current position of a camera relative to a road based on a set of imagery from the camera (e.g. external calibration) and (b) a recommended position of the camera relative to the road based on the set of imagery from the camera, while the camera is maintained at a constant height relative to the road (e.g. road surface) and a constant lateral distance relative to the road (e.g. road edge). The camera is hosted via a support structure and can be positionally adjusted (e.g. manually, motor, actuator) on the support structure from the current position to the recommended position based on a movement (e.g. rotation, tilt, pivot, slide) of the camera about a Z-axis (e.g. azimuth) of the camera at that time relative to the support structure and the road or based on a movement of the camera about a Y-axis (e.g. pitch) of the camera at that time relative to the support structure and the road. The camera is kept at the constant height relative to the road and the constant lateral distance relative to the road between the current position and the recommended position. In order to enable movement of the camera, a processor-generated guidance (e.g. visual marker, wizard, set of parameters) can be output (e.g. displayed) to a user (e.g. human technician, processor) such that the user can enable (e.g. perform, request) a manual adjustment of the camera from the current position to the recommended position or an automatic adjustment (e.g. local, remote) of the camera from the current position to the recommended position. For example, the camera can be positionally adjusted based on moving the camera in accordance with the processor-generated guidance (e.g. move the camera so that imagery is aligned/overlaid/coincides with the processor-generated guidance). As such, when the camera is generally oriented at the road from the support structure and imaging the road, then a processor (e.g. server, desktop, laptop, tablet, smartphone) can determine (a) the current position of the camera relative to the road and the support structure based on imaging the road and (b) the recommended position of the camera relative to the road and the support structure based on imaging the road, while the camera is maintained at a constant height relative to the road (e.g. road surface) and a constant lateral distance relative to the road (e.g. road edge). The camera can be positionally adjusted (e.g. manually, motor, actuator) on the support structure from the current position to the recommended position based on a movement (e.g. rotation, tilt, pivot, slide) of the camera about a Z-axis (e.g. azimuth) of the camera at that time relative to the support structure and the road or based on a movement of the camera about a Y-axis (e.g. pitch) of the camera at that time relative to the support structure and the road. The processor can generate a visual marker for the user so that the user can see how the camera needs to be positionally adjusted relative to the support structure and relative to the road. For example, this can be performed during installation/commissioning/maintenance of the camera. Also, this can also effectively minimize dangerous manual placement of physical road markers for camera calibration purposes or effectively minimize use of additional expensive measuring devices.

This disclosure is now described more fully with reference to FIGS. 1-6, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Moreover, note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein.

FIG. 1 shows a schematic diagram of an embodiment of a system for enabling an adjustment of a camera according to this disclosure. In particular, a system 100 includes a client 102, a network 104, a server 106, a network 108, a camera 110, a support structure 112, a field of vision 114, a road 116, a plurality of lanes 118, and a plurality of vehicles 120.

The client 102 can be embodied as a desktop, a laptop, a tablet, a smartphone, a software application, or others. The server 106 can be embodied as a web server, an application server, a database server, a virtual server, a software application, or others. The server 106 can run an operating system (e.g. Windows, UNIX) and an application (e.g. video analytics application) on the operating system. The network 104 or the network 108 can be embodied as a local area network, a wide area network, a cellular network, a satellite network, or others, whether wired or wireless. The network 104 and the network 108 can be identical to or different from each other in modality, type, size, scale, or others.

The client 102 can communicate (e.g. wired, wireless) with the network 104. The server 106 can communicate (e.g. wired, wireless) with the network 104. The client 102 and the server 106 can communicate (e.g. wired, wireless) over the network 104. The client 102 can access the application running on the operating system of the server 106 over the network 104. The server 106 can communicate (e.g. wired, wireless) with the network 108.

The camera 110 includes an optical instrument for capturing and recording images, which may be stored locally, transmitted to another location, or others. The images can be analog or digital, whether color or grayscale. When digital, the images can include pixels or voxels. The images can be individual still photographs or sequences of images constituting videos. The camera 110 can be powered via an accumulator or a mains electricity source. For example, the accumulator can store thermal energy, mechanical energy, or electrical energy. For example, the accumulator can include a rechargeable battery. The camera 110 can include or be coupled to a microphone. The camera 110 can include or be coupled to a flash illumination output device or another artificial illumination output device. The camera 110 can include or be coupled to an infrared illumination output device. The camera 110 can include a lens (e.g. concave, convex, wide-angle, telephoto, fisheye). The camera 110 can include or be coupled to an inclinometer, a spirit level, a gyroscope, or a tilt sensor, which can be coupled (e.g. fastened, mated, bracketed) to the support structure 112, configured to measure positioning or orientation of the camera 110. For example, the inclinometer can be configured to measure angles of slope (or tilt), elevation, or depression of the camera 110 with respect to gravity's direction, inclines (positive slopes, as seen by an observer looking upwards) and declines (negative slopes, as seen by an observer looking downward) using three different units of measure: degrees, percent, and slope. For example, the inclinometer can be built-in into the camera 110. The camera 110 can include or be coupled to a radar or a distance sensor, which can be coupled (e.g. fastened, mated, bracketed) to the support structure 112, configured to track the vehicles 120. For example, the radar or the distance sensor can track speed, acceleration, deceleration, direction, orientation, path, or others.

The camera 110 (e.g. pan-tilt-zoom, virtual pan-tilt-zoom camera, infrared) can communicate (e.g. wired, wireless) with the network 108. The server 106 can communicate (e.g. wired, wireless) with the camera 110 over the network 108. The client 102 can communicate with the camera 110 over the network 104 and over the network 108 through the server 106, which can be via the application running on the operating system of the server 106. As such, the client 102 can control the camera 110 (e.g. read imagery, receive real-time image data feed, control optical axis orientation, adjust zoom, modify focus).

The server 106 or the camera 110 can be configured for geo-tagging, such as via modifying an image file with geolocation/coordinates data. The server 106 or the camera 110 can be configured for name-stamping, date-stamping, or time-stamping the image (e.g. what date or time the image was captured or naming the image with a predefined naming convention). The server 106 or the camera 110 can be configured for de-warping images, such as disclosed in U.S. Pat. No. 9,947,079, which is herein incorporated by reference for all purposes.

The camera 110 is mounted (e.g. fastened, mated, interlocked, bracketed, adhered, magnetized) to a support structure 112 (e.g. utility pole, transmission tower, cellular tower, overpass, traffic light, bridge, building wall, building roof, separation barrier, fence, water tower). The camera 110 can be maintained at a constant height (e.g. within about 1, 3, 5, 7, 10, 15, 20, 30, 50 meters) relative to the road 116 (e.g. road surface) and a constant lateral distance (e.g. within about 1, 3, 5, 7, 10, 15, 20, 30, 50 meters) relative to the road 116 (e.g. road edge). The camera 110 can be positionally adjustable, whether manually or automatically (e.g. motor, actuator, gears, pneumatics, hydraulics), relative to the support structure 112 between at least a first position (e.g. current position) and a second position (e.g. recommended position) or vice versa. For example, the camera 110 can be positionally adjustable based on a movement (e.g. rotation, tilt, pivot, slide) of the camera 110 about a Z-axis (e.g. azimuth) of the camera 110 at that time relative to the road 116 between the first position and the second position or based on a movement of the camera 110 about a Y-axis (e.g. pitch) of the camera 110 at that time relative to the road 116 between the first position and the second position or vice versa.

The support structure 112 is positioned in proximity (e.g. within about 1, 3, 5, 7, 10, 15, 20, 30, 50 meters) of the road 116 (e.g. street, parkway, highway, boulevard, avenue, tunnel, aboveground, underground) such that the camera 110 can have the field of vision 114 capturing the road 116. For example, the camera 110 can be positioned in proximity (e.g. within about 1, 3, 5, 7, 10, 15, 20, 30, 50 meters) of the road 116. For example, the support structure can be on the road 116, off the road 116, or over the road 116. The support structure 112 can be fixed to a ground surface (e.g. staked, bolted, cemented) or the support structure 112 can be freestanding (e.g. resting, sitting, laying, tripod) on the ground surface such that the support structure 112 can be periodically (e.g. hourly, daily, weekly, monthly) movable (e.g. along the road 116, toward the road 116, away from the road 116). In some situations, whether additionally or alternatively, the camera 110 can be mounted (e.g. fastened, mated, interlocked, bracketed, adhered, magnetized) to a vehicle (e.g. car, van, bus, truck, motorcycle) in order to enable a mobile imaging point. In some situations, the client 102 can be mobile and can be positioned in proximity of the support structure 112 or the camera 110 (e.g. within about 1, 3, 5, 7, 10, 15, 20, 30, 50 meters).

The road 116 has the lanes 118 on which the vehicles 120 travel or stand. The road 116 can extend rectilinearly or non-rectilinearly (e.g. arcuate, sinusoidal). The vehicles 120 (e.g. cars, vans buses, trucks, motorcycles) can be stationary or moving within the lanes 118 in a plurality of directions, whether rectilinear or arcuate, whether opposing directions or same direction, relative to the camera 110 and the support structure 112. The road 116 can have a single lane 118 or more than two lanes 118 or no lane markings at all. The vehicles 120 can host a plurality of license plates, whether static or dynamic (e.g. electronic). The license plates host a plurality of identifiers (e.g. alphanumeric strings, graphics). As such, the camera 110 is mounted on the support structure 112 such that (a) the field of vision 114 captures the license plates of the vehicles 120, while the vehicles 120 are positioned on the road 116, (b) the camera 110 images the license plates, and (c) the camera 110 sends (e.g. feeds, live streams, uploads, messages, emails) a set of imagery (e.g. photos, videos) depicting the road 116 or the vehicles 120 or the license plates to the server 106 over the network 108 for processing (e.g. object detection, face detection, license plate recognition) or access via the client 102 over the network 104, which can be via the application running on the operating system of the server 106.

The set of imagery can be stored in a database, whether single or distributed. The database can be a relational database, an in-memory database, a NoSQL database, a graphical database, or others, which can store data, such as in a record field, and allow access to such data, whether in a raw state, a formatted state, an organized stated, or any other accessible state. For example, such data can include an image file, a video file, a sound file, an alphanumeric text string, or any other data. The database can be configured for various data Input/Output (I/O) operations, including reading, writing, editing, modifying, deleting, updating, searching, selecting, merging, sorting, encrypting/decrypting, de-duplicating, or others. The server 106 can host the database or the database can be hosted remote to the server 106.

In one mode of operation, the server 106 can be used to enable camera adjustments. The server 106 can determine the current position of the camera 110 relative to the road 116 based on a set of imagery (e.g. photos, videos) from the camera 110 and the recommended position of the camera 110 relative to the road 116 based on the set of imagery from the camera 110, while the camera 110 is maintained at a constant height relative to the road 116 (e.g. road surface) and a constant lateral distance relative to the road 116 (e.g. road edge). The camera 110 is hosted via the support structure 112 and can be positionally adjusted (e.g. manually, motor, actuator) on the support structure 112 from the current position to the recommended position based on a movement (e.g. rotation, tilt, pivot, slide) of the camera 110 about a Z-axis (e.g. azimuth) of the camera 110 at that time relative to the support structure 112 or based on a movement of the camera 110 about a Y-axis (e.g. pitch) of the camera 110 at that time relative to the support structure 112. The camera 110 is kept at the constant height relative to the road 116 and the constant lateral distance relative to the road 116 between the current position and the recommended position. In order to enable movement of the camera 110, the server 106 serves a guidance (e.g. visual marker, wizard, set of parameters) for output (e.g. display) to the client 102 (e.g. human, computer) such that the user can enable (e.g. perform, request) a manual adjustment of the camera 110 from the current position to the recommended position or an automatic adjustment (e.g. local, remote) of the camera 110 from the current position to the recommended position. For example, this can be performed during installation/commissioning/maintenance of the camera. This can also effectively bypass or effectively minimize dangerous manual placement of physical road markers for camera calibration purposes or effectively minimize use of additional expensive measuring devices.

Figure 2:
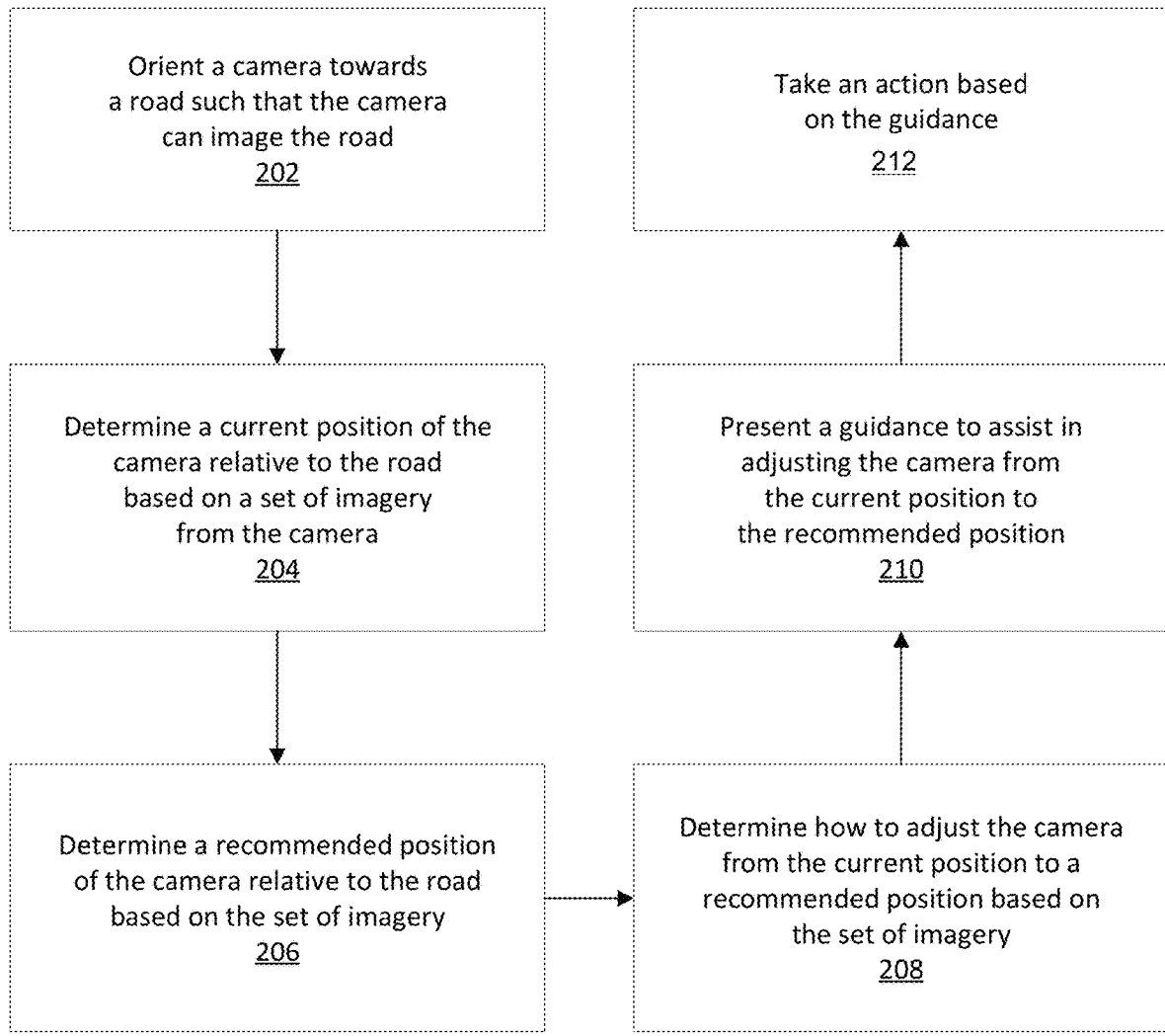
FIG. 2 shows a flowchart of an embodiment of a method of enabling an adjustment of a camera according to this disclosure.

FIG. 2 shows a flowchart of an embodiment of a method of enabling an adjustment of a camera according to this disclosure. A method 200 includes a plurality of blocks 202-212. The method 200 is implemented via the system 100 of FIG. 1.

In block 202, the camera 110 is oriented towards the road 116 (e.g. general direction) such that the camera 110 can image the road 116 with the lanes 118 and the vehicles 120. The camera 110 images the road 116 by generating a set of imagery (e.g. photos, videos) and sending the set of imagery to the server 106 over the network 108.

In block 204, the server 106 determines a current position (e.g. current optical axis) of the camera 110 relative to the road 116 based on the set of imagery received from the camera 110 over the network 108. The current position can be determined in various ways. For example, the server 106 can determine the current position based on processing the set of imagery and determining, from the set of imagery, the current position of the camera 110 based on the lanes 118 and the vehicles 120 or other visual points/landmarks shown in the set of imagery, while accommodating for what type of the camera 110 is used, how high the camera 110 is raised from the road 116, how far the camera 110 is laterally spaced from the road 116, how wide the road 116 spans, how many of the lanes 118 the road 116 has, and other technical factors, as preprogrammed in advance into the server 106.

In block 206, the server 106 determines a recommended position (e.g. recommended optical axis) of the camera 110 relative to the road 116 based on the set of imagery received from the camera 110 over the network 108. The recommended position can be determined based on the current position and the lanes 118, and the vehicles 120 or other visual points/landmarks shown in the set of imagery, while accommodating for what type of the camera 110 is used, how high the camera 110 is raised from the road 116, how far the camera 110 is laterally spaced from the road 116, how wide the road 116 spans, how many of the lanes 118 the road 116 has, and other technical factors, as preprogrammed in advance into the server 106.

In block 208, the server 106 determines how to positionally adjust the camera 110 from the current position to the recommended position based on the set of imagery. This can be determined in various ways. For example, the server 106 can compare a set of pixel/object coordinates for the current position and a set of pixel/object coordinates for the recommended position and then determine a direction/axis/plane in which the camera 110 may have to be moved to get to the recommended position from the current position.

In block 210, the server 106 presents a guidance to assist the user in adjusting the camera 110 from the current position to the recommended position. The user can be operating the client 102 and the server 106 can present the guidance to the client 102 over the network 104. The guidance can be embodied as a visual marker, a wizard, a set of parameters, a set of directions, or others, whether for visual output or sound output on the client 102. The visual guidance can include a landmark graphic (e.g. purple box) that remains still and a current view graphic (e.g. yellow box) that is movable.

In block 212, the server 106 enables an action to be taken based on the guidance. The action can be relative to the camera 110 or the set of imagery. For example, the action can include requesting the camera 110 to be moved from the current position to the recommended position relative to the support structure 112 based on the guidance and relative to the road 116 based on the guidance, while the camera 110 is maintained at a constant height relative to the road 116 (e.g. road surface) and a constant lateral distance relative to the road 116 (e.g. road edge). The camera 110 can be moved from the current position to the recommended position based on a movement (e.g. rotation, tilt, pivot, slide) of the camera 110 about a Z-axis (e.g. azimuth) of the camera 110 at that time or based on a movement of the camera 110 about a Y-axis (e.g. pitch) of the camera 110 at that time. For example, the automatic adjustment can be motorized or actuated. The action can be requested via the server 106 or via the client 102. The action can include various cursor-based user interface operations (e.g. dragging, pointing, selecting, clicking, gesturing) sourced from the client 102 (e.g. touch-based, cursor-based, keyboard-based) and on the guidance or relative to the guidance output via the client 102. When the visual guidance includes the landmark graphic and the current view graphic, when the camera 110 is moved from the current position toward the recommended position, the landmark graphic remains still and the current view graphic moves toward the landmark graphic corresponding to movement of the camera 110. The current view graphic can be aligned or overlaid over the landmark graphic. When this alignment or overlay happens with sufficient accuracy, the camera 110 can be calibrated again.

Figure 3:
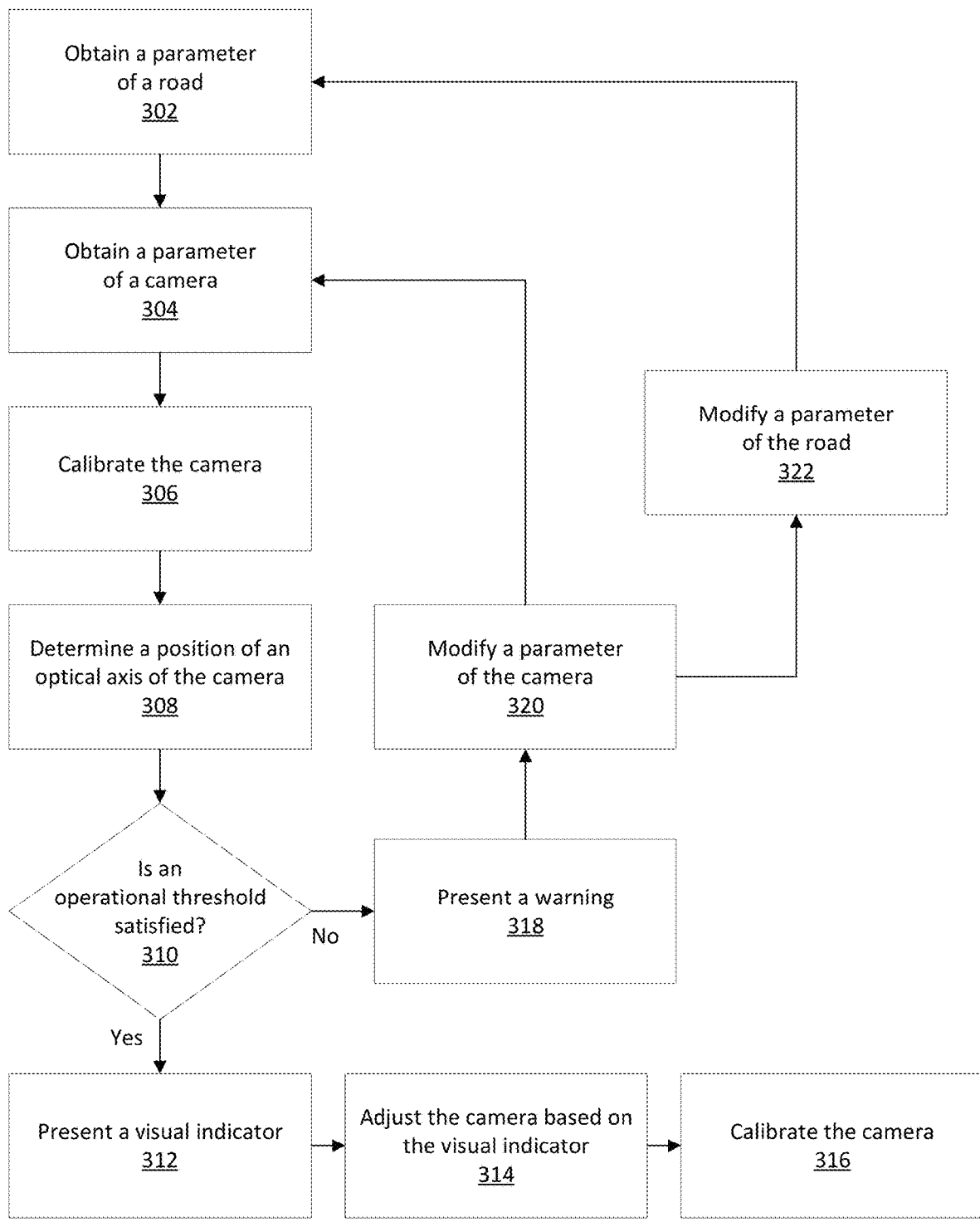
FIG. 3 shows a flowchart of an embodiment of a method of enabling an adjustment of a camera according to this disclosure.

FIG. 3 shows a flowchart of an embodiment of a method of enabling an adjustment of a camera according to this disclosure. A method 300 includes a plurality of blocks 302-322. The method 300 is implemented via the system 100 of FIG. 1.

In block 302, the server 106 obtains a parameter of the road 116. This can be obtained via the server 106 determining (or re-determining based on repetitive iteration) the parameter of the road 116, which can user input from the client 102 over the network 104, retrieved from database, preprogrammed, or others. The parameter can include a size (e.g. length, width) of a control area on the road 116, lane amount, lane size, surface coloration, or others.

In block 304, the server 106 obtains a parameter of the camera 110. This can be obtained via the server 106 determining (or re-determining based on repetitive iteration) the parameter of the camera 110, which can user input from the client 102 over the network 104, retrieved from database, preprogrammed, or others. The parameter of the camera 110 can include a number of pixels of a camera matrix along a vertical plane and a horizontal plane, a size of a pixel of a camera matrix, a number of frames per second, a focal length of a camera lens, a lens type, or others. The camera 110 can be oriented in a general direction of the road 116.

In block 306, the server 106 enables calibration of the camera 110 at a current position of the camera 110. This can be enabled in various ways from manually marking of characteristic image points at the current position of the camera 110 to imaging the vehicles 120 moving in the control area of the road 116 at the current position of the camera 110. This calibration can include the server 106 determining a current rotation angle (e.g. Y-axis, Z-axis) of the camera 110 in space relative to the road 116 and a vertical height of the camera 110, which can user input from the client 102 over the network 104, retrieved from database, preprogrammed, or others. For example, the current rotation angle can be determined relative to the road 116 and not relative to a horizontal axis of the camera 110 at that time.

Figure 4:
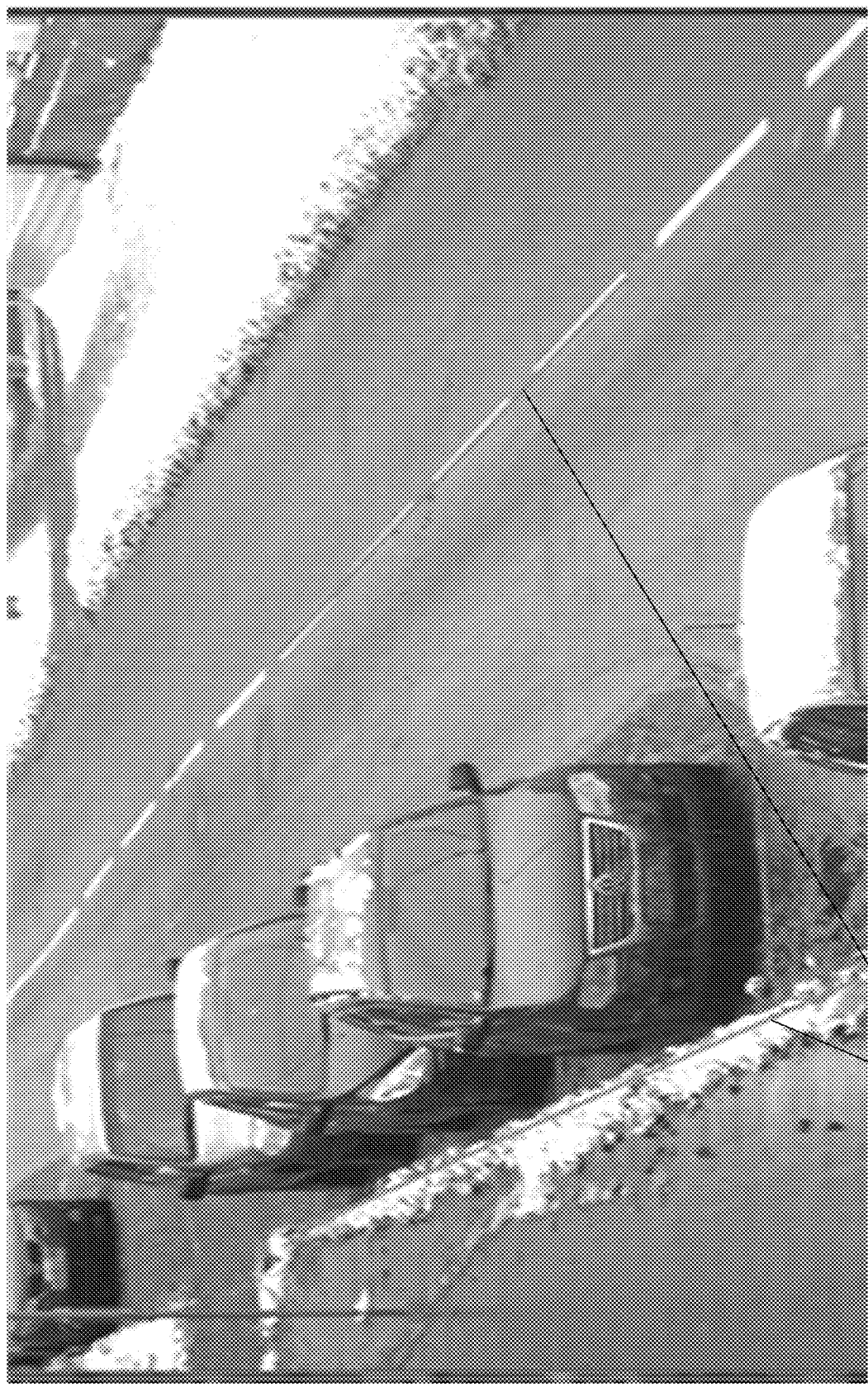
FIGS. 4-6 show an embodiment of a user interface for enabling an adjustment of a camera according to this disclosure.

For example, the vertical height of the camera 110 can be measured between a ground surface underneath the camera 110 (inclusive of the road 116) and the camera 110 mounted on the support structure 112. The vertical height and an offset of the camera 110 relative to the road 116 can be measured or determined based on a displacement or shift of a plurality of characteristic points of a scene (from a set of imagery sourced from the camera 110) due to a movement of the camera 110 relative to the road 116 and relative to the support structure 112 during a commissioning process and based on a reading from the inclinometer, which measures a variation of a pitch angle of the camera 110 relative to the road 116 and relative to the support structure 112 and a roll angle of the camera 110 relative to a horizontal axis of the camera 110 in a process of rotating the camera 110 relative to the road 116 and the support structure 112, as shown in FIG. 4. For example, the camera 110 can be positionally adjusted (e.g. manually, motor, actuator) on the support structure 112 from the current position to the recommended position based on a movement (e.g. rotation, tilt, pivot, slide) of the camera 110 about a Z-axis (e.g. azimuth) of the camera 110 at that time relative to the support structure 112 or based on a movement of the camera 110 about a Y-axis (e.g. pitch) of the camera 110 at that time relative to the support structure 112.

In block 308, the server 106 determines a position of an optical axis of the camera 110 in space at the current position of the camera 110. The server 106 determines the optical axis for optimal operation of the camera 110 for various purposes (e.g. license plate recognition, object detection). The position of the optical axis is determined via the server 106, while taking into account the parameter of the road 116 (e.g. control area size), the parameter of the camera 110 (e.g. settings, lens, image sensors), calibration data of the camera 110, and some restrictions (e.g. minimum distance from the radar to the vehicles 120, minimum resolution value (pixel per centimeter) for license plate recognition logic on a distal boundary of a control area, maximum azimuth angle permissible for the radar, maximum pitch angle allowable for the radar, maximum height of the radar taking into account its maximum working angles in azimuth and pitch, maximum speed of the vehicles 120 in a control area) in order to verify an operational feasibility of the camera 110 at the current position of the camera 110 and without exceeding at least some of the restrictions noted above.

In block 310, the server 106 determines whether an operational threshold has been satisfied. The operational threshold relates the operational feasibility being possible or not (e.g. true, false, yes, no, within permissible range, outside permissible range). If the operational threshold has been satisfied (yes), then block 312 is performed. For example, if the operational feasibility of the camera 110 is possible, as noted above, then the server 106 can select a position of a control area on the road 116 (based on imagery sourced from the camera 110) and a plurality of angles of the camera 110 (the angles corresponding to the position) in space in which a resolution on a distal border of the control area would have a maximum value, especially with a set of parameters, as described above, a set of restrictions, as described above, which can be helpful for various image processing operations (e.g. license plate recognition, object recognition). If the operational threshold has not been satisfied (no), then block 318 is performed, where a warning message (e.g. visual, audio) can be output (e.g. display, speaker) and a user can select an action of block 320 or block 322 (or reduce a width size value of the control area of the road 116 or change equipment configuration selecting another digital camera with a large amount of pixels and another lens or reduce a maximum speed value of the vehicles 120 (as imaged or recognized) in which correct camera 110 operation is likely or increase a frame per second value). After such changes, the process 300 can be iteratively repeated from block 302 or block 304 to block 308 or block 310 until the server 106 determines that the camera 110 can operate in its current configuration under various specified conditions and then block 312 can be performed.

In block 312, the server 106 presents a visual indicator to the client 102 over the network 104. The visual indicator can include any form of visual guidance (e.g. visual marker, wizard, set of parameters, popup, slide out, hover over, virtual character). For example, the camera 110 can capture a set of imagery (e.g. photo, video) of the road 116 and send the set of imagery to the server 106. Then, the server 106 receives the set of imagery from the camera 110. Then, the server 106 modifies the set of imagery or presents graphics over the set of imagery such that an area of the road 116 is visually emphasized, visually distinct, or visually stood out (based on camera calibration data and road sizes). This visual emphasis, visual distinction, or visual standing out is such that if the camera 110 is turned (e.g. rotated, pivoted, tilted, slid) from the current position into a recommended position then the area of the road 116 would be or would still be in a field of view of an optical axis of the camera 110 (see FIG. 4). For example, the camera 110 can be positionally adjusted (e.g. manually, motor, actuator) on the support structure 112 from the current position to the recommended position based on a movement (e.g. rotation, tilt, pivot, slide) of the camera 110 about a Z-axis (e.g. azimuth) of the camera 110 at that time relative to the support structure 112 or based on a movement of the camera 110 about a Y-axis (e.g. pitch) of the camera 110 at that time relative to the support structure 112.

Figure 5:
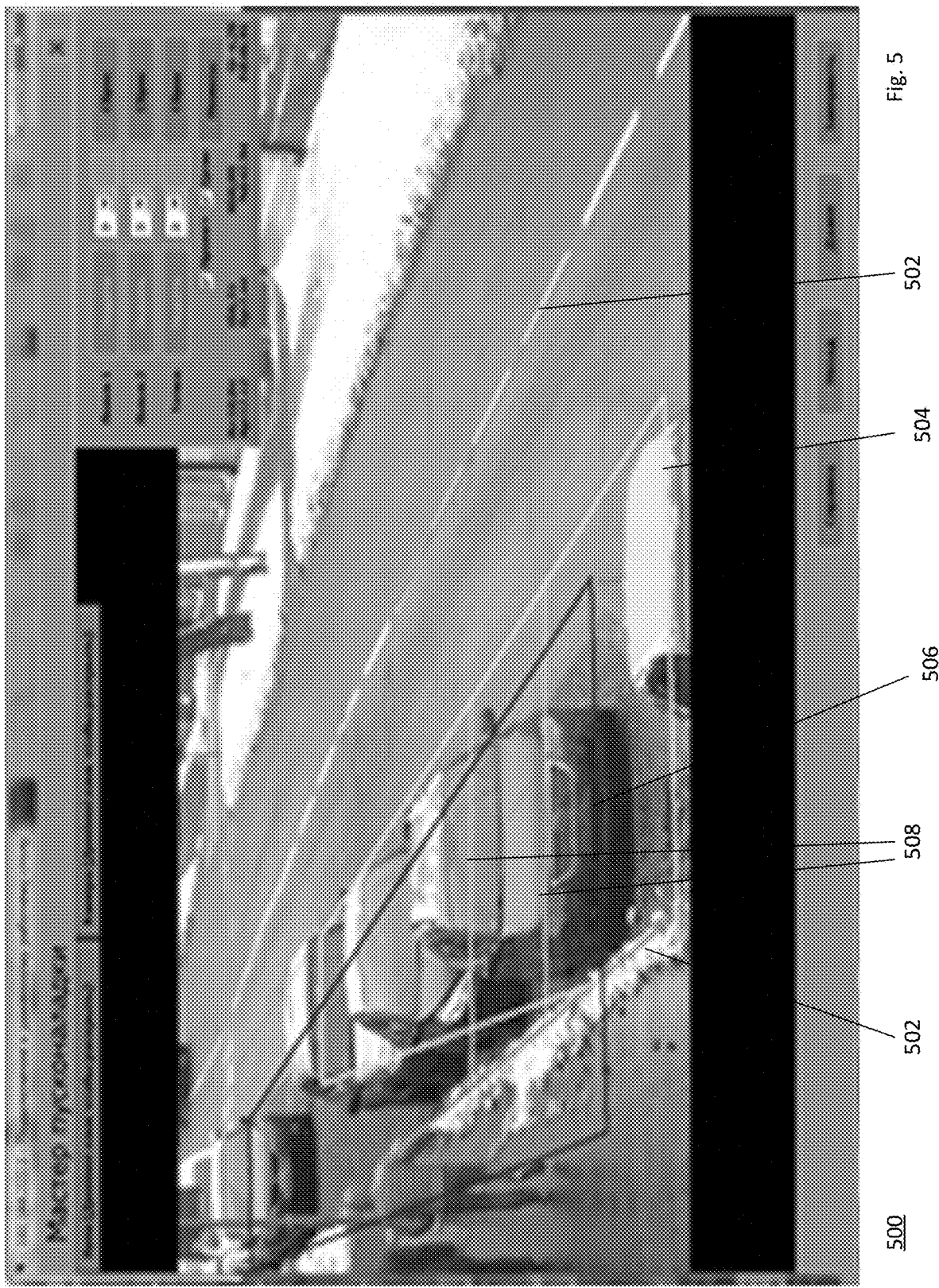

If this is possible (would be or would still be in a field of view of an optical axis of the camera 110), then the server 106 presents a yellow box (although other colors (e.g. red, blue, green, orange, purple, white, black) are possible) within the set of imagery or over the set of imagery (see FIG. 5). The yellow box can be of any shape (e.g. symmetrical, asymmetrical, polygon, square, rectangular, circular, oval, pentagon, octagon, acute corner, rounded corner). The yellow box can represent a current field of view pattern of the camera 110. The yellow box indicates which section of the set of imagery of the road 116 will be captured as an original image for forming a marker (the current position—where am I currently). Further, the server 106 presents a purple box (although other colors (e.g. red, blue, green, orange, yellow, white, black) are possible) within the set of imagery or over the set of imagery (see FIG. 5). The purple box can be of any shape (e.g. symmetrical, asymmetrical, polygon, square, rectangular, circular, oval, pentagon, octagon, acute corner, rounded corner), whether identical or different from the yellow box in color, shape, area, symmetry, thickness, or others. The purple box can represent a recommended field of view pattern of the camera 110. The purple box indicates which position will the marker be at after performing various three-dimensional transformations thereon (the recommended position—where should I be). Additionally, the server 106 presents a plurality of blue lines (although other colors (e.g. red, purple, green, orange, yellow, white, black) are possible). The blue lines can be rectilinear or non-rectilinear (e.g. arcuate, sinusoidal, sawtooth). The blue lines can be identical to or different from each other in color, thickness, longitudinal extension, or others. The blue lines indicates a position of a zone of control of a vehicle (see FIG. 5). For example, the license plates of the vehicles 120 can be imaged from the zone of control.

If this is not possible (would not be or would still not be in a field of view of an optical axis of the camera 110) because, in the current position of the camera 110, there is no adequate visibility of a section of the road 116 at its end or final position, then the server 106 generates a pointer (e.g. arrow, virtual character, wizard, guide, popup, slide-out, hover over) and serves the pointer to the client 102 over the network 104. The pointer guides a user to move (e.g. turn, rotate, tilt, pivot, slide) the camera 110 until a positon from which such construction of imagery (the marker) will be possible.

Figure 6:

Once the marker can be visualized, the server 106 generates an image of the marker in a form of a green field (although other colors (e.g. red, purple, brown, orange, yellow, white, black) are possible) and serves the image of the marker to the client 102 over the network 104 (see FIG. 6). The green field can be of any shape (e.g. symmetrical, asymmetrical, polygon, square, rectangular, circular, oval, pentagon, octagon, acute corner, rounded corner). The green field is displayed on the client 102 in order to enable a user of the client 102, while the camera 110 is being moved, to combine (e.g. jigsaw), reconcile, overlay, align, or match a visible image, which is being live streamed from the camera 110 to the client 102 over the server 106 via the network 108 and the network 104 and showing moving roads on the display of the client 102 while the camera 110 is being moved (e.g. road artifacts), with a static image of the marker, which can be colored green (or another color), semi-transparent (e.g. translucent), or pulsating (in order to ease visual distinction of the static image of the marker relative to road imagery while the camera 110 is being moved). For example, when the camera 110 is moved from the current position toward the recommended position, the purple box remains still and the yellow box moves toward the purple box corresponding to movement of the camera 110. The yellow box can be aligned or overlaid over the purple box. For example, the camera 110 can be positionally adjusted (e.g. manually, motor, actuator) on the support structure 112 from the current position to the recommended position based on a movement (e.g. rotation, tilt, pivot, slide) of the camera 110 about a Z-axis (e.g. azimuth) of the camera 110 at that time relative to the support structure 112 or based on a movement of the camera. 110 about a Y-axis (e.g. pitch) of the camera 110 at that time relative to the support structure 112.

In block 314, the camera 110 is positionally adjusted, whether manually or automatically (e.g. motor, actuator, pneumatic, hydraulic), based on the visual indicator. This can happen when the camera 110 is moved (e.g. rotation, tilt, pivot, slide) such that a visible image of a scene, as live streamed from the camera 110 to the client 102 over the network 108 and the network 104 through the server 106, and an image of the scene on a fixed or static marker coincide, overlay, or align, which can be as much as possible. For example, when the camera 110 is moved from the current position toward the recommended position, the purple box remains still and the yellow box moves toward the purple box corresponding to movement of the camera 110. The yellow box can be aligned or overlaid over the purple box. For example, the camera 110 can be positionally adjusted (e.g. manually, motor, actuator) on the support structure 112 from the current position to the recommended position based on a movement (e.g. rotation, tilt, pivot, slide) of the camera 110 about a Z-axis (e.g. azimuth) of the camera 110 at that time relative to the support structure 112 or based on a movement of the camera 110 about a Y-axis (e.g. pitch) of the camera 110 at that time relative to the support structure 112. Note that there are situations when the camera 110 is not properly secured to the support structure 112. As such, in these situations, there may be an unresolved discrepancy between a required and actual position of the camera 110 relative to the road 116.

In block 316, the camera 110 is calibrated for refinement, elaboration, correction, clarification, or revision of positional values of the camera 110 in space, which were achieved in block 314. After this calibration, the camera 110 is considered to be installed properly and ready for operation.

FIGS. 4-6 show an embodiment of a user interface for enabling an adjustment of a camera according to this disclosure. As shown in FIG. 4, a screenshot 400 shows a plurality of road borders 402 (green rectilinear lines but other colors or non-rectilinear lines are possible) corresponding to an current optical axis of the camera 110. The road boarders 402 can be manually drawn via the client 102 or automatically determined (e.g. based on imagery of the road 116). As shown in FIG. 5, a screenshot 500 shows a pair of road borders 502 (green rectilinear lines but other colors or non-rectilinear lines are possible), a current position camera optical axis box 504 (yellow trapezoid but other colors or shapes are possible), a recommended position camera optical axis box 506 (purple trapezoid but other colors or shapes are possible), and a plurality of control zone lines 508 (blue rectilinear lines but other colors or non-rectilinear lines are possible). The current position camera optical axis box 504 indicates which section of a set of imagery of the road 116 will be captured as an original image for forming a marker. The recommended position camera optical axis box 506 indicates which position will the marker be at after performing various three-dimensional transformations on the screenshot 500. For example, when the camera 110 is moved from the current position toward the recommended position, the recommended position camera optical axis box 506 remains still and the current position camera optical axis box 504 moves toward the purple box corresponding to movement of the camera 110. The current position camera optical axis box 504 can be aligned or overlaid over the recommended position camera optical axis box 506. This would indicate that the camera 110 is now properly oriented relative to the road 116. The control zone lines 508 indicate a position of a zone of control of a vehicle. For example, the license plates of the vehicles 120 can be imaged from the zone of control. As shown in FIG. 6, a screenshot 600 shows a recommended position camera optical axis box 602 (green trapezoid but other colors or shapes are possible) corresponding to the recommended position of the camera 110 at this time after the camera 110 has been moved from the current position to the recommended position based on moving the current position camera optical axis box 504 toward the recommended position camera optical axis box 506, as shown in FIG. 5.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method, comprising:
    accessing, by a processor, a parameter of a control area of a road and an imaging parameter of a camera having an optical axis;
    enabling, by the processor, a calibration of the camera at a current position of the camera relative to the road, wherein the calibration includes determining, by the processor, a current rotation angle of the camera in space relative to the road, and a vertical height or an offset of the camera;
    determining, by the processor, a position of the optical axis in space at the current position of the camera based on the parameter of the control area of the road, the imaging parameter, the calibration, and an operational restriction;
    determining, by the processor, an operational feasibility of the camera at the current position based on the position of the optical axis of the camera and without exceeding the operational restriction; and
    taking, by the processor, an action associated with positionally adjusting the camera based on determining, by the processor, that an operational threshold is satisfied based on the operational feasibility, wherein the action includes:
        causing, by the processor, a user interface to concurrently present the road, a current pattern, and a recommended pattern, wherein the current pattern corresponds to the current position of the camera, wherein the recommended pattern corresponds to a recommended position to which the camera should be positionally adjusted, wherein the current pattern and the recommended pattern are visually distinct from each other and are shown over the road;
        receiving, by the processor, a user input from a client while the user interface concurrently shows the road, the current pattern, and the recommended pattern as the camera images the road during the current position, wherein the user input moves the current pattern toward the recommended pattern over the road on the user interface; and
        enabling, by the processor, the camera to be moved from the current position toward the recommended position relative to the road based on the user input while the user interface concurrently shows the road, the current pattern, and the recommended pattern as the camera images the road.

2. The method of claim 1, wherein the action includes causing, by the processor, a visual guidance to be presented on an electronic display presenting the user interface, wherein the visual guidance is programmed to be visually informative such that (a) the camera can be positionally adjusted from the current position into the recommended position thereof and (b) the camera can be calibrated at the recommended position.

3. The method of claim 2, wherein the visual guidance is programmed to be a visual marker, a wizard, a set of parameters, a popup, a slide out, a hover over, or a virtual character.

4. The method of claim 2, wherein the camera is configured to be positionally adjusted by being rotated, pivoted, tilted, or slid from the current position into the recommended position while the control area would be or would still be in the optical axis of the camera.

5. The method of claim 2, wherein the camera is configured to be manually positionally adjusted from the current position into the recommended position thereof.

6. The method of claim 2, wherein the camera configured to be automatically positionally adjusted from the current position into the recommended position thereof.

7. The method of claim 2, wherein the camera is configured to be positionally adjusted from the current position into the recommended position thereof based on moving the camera about a Z-axis of the camera relative to a support structure supporting the camera.

8. The method of claim 2, wherein the camera is configured to be positionally adjusted from the current position into the recommended position thereof based on moving the camera about moving the camera about a Y-axis of the camera relative to a support structure supporting the camera.

9. The method of claim 1, wherein the calibration includes determining, by the processor, the current rotation angle of the camera in space relative to the road and the vertical height of the camera.

10. The method of claim 1, wherein the calibration includes determining, by the processor, the current rotation angle of the camera in space relative to the road and the offset of the camera.

11. The method of claim 1, further comprising:
    instructing, by the processor, a warning message to be output by a display or a speaker based on the operational threshold not being satisfied.

12. The method of claim 11, wherein the user input is a first user input, and further comprising:
    modifying, by the processor, the imaging parameter based on a second user input; and
    determining, by the processor, the position of the optical axis in space at the current position of the camera based on the parameter of the control area of the road, the imaging parameter as modified based on the second user input, the calibration, and the operational restriction.

13. The method of claim 12, further comprising:
modifying, by the processor, the parameter of the control area of the road based on a third user input after the second user input; and
accessing, by the processor, the parameter of the control area of the road based on the second user input and the imaging parameter of the camera having the optical axis.

14. The method of claim 1, wherein the user input is programmed to enable the current pattern to be moved toward the recommended pattern such that the current pattern overlays the recommended pattern.

15. The method of claim 1, wherein the camera is configured to image the road at the current position in a first manner, wherein the camera is configured to image the road at the recommended position in a second manner, wherein the road includes a vehicle bearing a license plate, wherein the license plate includes an identifier, wherein the processor is not programmed to recognize the identifier in the current position, wherein the processor is programmed to recognize the identifier in the recommended position.

16. The method of claim 1, wherein the camera is configured to image the road at the recommended position in a first manner, wherein the camera is configured to image the road at the recommended position in a second manner, wherein the road includes an object, wherein the processor is not programmed to recognize the object in the current position, wherein the processor is programmed to recognize the object in the recommended position.

17. The method of claim 1, wherein the current pattern is color-outlined in a first color, wherein the recommended pattern is color-outlined in a second color, wherein the current pattern and the recommended pattern are visually distinct from each other based on the first color and the second color being visually distinct from each other.

18. The method of claim 1, wherein the parameter of the control area of the road is a size of the control area.

19. A system, comprising:
a processor programmed to:
access a parameter of a control area of a road and an imaging parameter of a camera having an optical axis;
enable a calibration of the camera at a current position of the camera relative to the road, wherein the calibration includes determining, by the processor, a current rotation angle of the camera in space relative to the road, and a vertical height or an offset of the camera;
determine a position of the optical axis in space at the current position of the camera based on the parameter of the control area of the road, the imaging parameter, the calibration, and an operational restriction;
determine an operational feasibility of the camera at the current position based on the position of the optical axis of the camera and without exceeding the operational restriction; and
take an action associated with positionally adjusting the camera based on determining that an operational threshold is satisfied based on the operational feasibility, wherein the action includes:
causing, by the processor, a user interface to concurrently present the road, a current pattern, and a recommended pattern, wherein the current pattern corresponds to the current position of the camera, wherein the recommended pattern corresponds to a recommended position to which the camera should be positionally adjusted, wherein the current pattern and the recommended pattern are visually distinct from each other and are shown over the road;
receiving, by the processor, a user input from a client while the user interface concurrently shows the road, the current pattern, and the recommended pattern as the camera images the road during the current position, wherein the user input moves the current pattern toward the recommended pattern over the road on the user interface; and
enabling, by the processor, the camera to be moved from the current position toward the recommended position relative to the road based on the user input while the user interface concurrently shows the road, the current pattern, and the recommended pattern as the camera images the road.

* * * * *